United States Patent
Calzone et al.

(10) Patent No.: US 9,043,822 B1
(45) Date of Patent: May 26, 2015

(54) REMOTE TIME SHIFT BUFFERING WITH SHADOW TUNING

(71) Applicant: Cox Communications, Inc., Atlanta, GA (US)

(72) Inventors: Steven J. Calzone, Johns Creek, GA (US); Hui Zhao, Alpharetta, GA (US); Neil B. Buchen, Buford, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 13/830,643

(22) Filed: Mar. 14, 2013

(51) Int. Cl.
H04N 21/45 (2011.01)
H04N 21/6587 (2011.01)
H04N 21/654 (2011.01)
H04N 21/23 (2011.01)
H04N 21/2387 (2011.01)
H04N 21/65 (2011.01)

(52) U.S. Cl.
CPC ....... *H04N 21/4508* (2013.01); *H04N 21/6587* (2013.01); *H04N 21/654* (2013.01); *H04N 21/23* (2013.01); *H04N 21/2387* (2013.01); *H04N 21/65* (2013.01)

(58) Field of Classification Search
None
See application file for complete search history.

(56) References Cited

U.S. PATENT DOCUMENTS

| | | | |
|---|---|---|---|
| 2008/0163330 A1* | 7/2008 | Sparrell | 725/142 |
| 2009/0089832 A1* | 4/2009 | Kendall | 725/38 |
| 2009/0142042 A1* | 6/2009 | Branam | 386/124 |
| 2010/0074600 A1* | 3/2010 | Putterman et al. | 386/124 |
| 2011/0246563 A1* | 10/2011 | Keum et al. | 709/203 |

* cited by examiner

*Primary Examiner* — Justin Shepard
(74) *Attorney, Agent, or Firm* — Merchant & Gould P.C.

(57) ABSTRACT

A remote time shift buffer system with shadow tuning. The remote time shift buffer system includes a client in communication with a remote video recorder. The client tunes to a channel from a television signal source and sends the channel content to a television. When a channel change occurs at the client, the remote video recorder tunes to the same channel as the client and buffers the content. When a pause live television (PLTV) function is initiated, the remote video recorder generates an independent RTSB content stream using the buffered content. Once the RTSB content stream is available, the client switches inputs and displays the RTSB content stream from the remote video recorder. Manipulating the position within the RTSB content stream does not affect buffering of the live content. The remote time shift buffer system provides pause live television functionality with minimal loss of content.

20 Claims, 5 Drawing Sheets

REMOTE TIME SHIFT BUFFERING WITH SHADOW TUNING

BACKGROUND

A local digital video recorder may be used as the tuner to select and watch content on a television or as pass-through device that accepts content tuned using a client, such as a set-top box from a cable company or other source. Some digital video recorders automatically record the content stream being watched allowing pause live television functionality. "Live" in this context refers to the contemporaneous nature of the content stream, not the content of the stream (which may be pre-recorded). To have pause live television functionality at multiple televisions, each television must have a local digital video recorder connected between the source and the television. Often, the buffering that enables the pause live television feature introduces a delay of several seconds into the content stream. This can result in a disconcerting effect when two nearby televisions are tuned to the same channel, but only one has pause live television functionality because the content streams are out of sync.

More recently, some clients can communicate with a remote digital video recorder over the viewer's local area network. The networked digital video recorder is able to record content from any television without having a digital video recorder dedicated to each television. While some networked digital video recorders offer pause live television functionality, it is implemented on demand. When the viewer pauses the live television using their remote, the client communicates with the networked digital video recorder. At that point, the networked digital video recorder tunes into the channel being watched and starts recording. When the viewer resumes watching the program, the content stream is supplied from the networked digital video recorder service starting at the pause point rather than the live television content stream.

Communicating, switching channels, and starting to record the content is not an instantaneous process. The actual pause point is later than the point when the viewer pressed the pause button. As a result, when the program is resumed some content will be lost and cannot be revisited. It is not uncommon for a digital video recording service to have an actual pause point that occurs 15 seconds after the pause button is pressed. Such a long delay may be significant in the viewing experience. For example, if a viewer watching a baseball game presses pause right before a pitch, the actual pause point from where the content would resume might be from where the catcher is throwing the ball back to the pitcher. In other words, the long delay effectively causes the pitch to be missed. At the very least, this situation does not make for a positive viewer experience. It was with these problems in mind that the present invention was conceived.

BRIEF SUMMARY

Embodiments of the present invention may provide for a remote time shift buffer (RTSB) system with shadow tuning providing pause live television functionality. The remote time shift buffer system includes a client in communication with a remote video recorder. The client tunes to a channel in a signal from a television signal source and sends the content to a television. When a pause live television (PLTV) function is initiated, the remote video recorder generates an independent RTSB content stream using the buffered content and publishes it for use by the client. Once the RTSB content stream is available, the client switches inputs and displays the RTSB content stream from the remote video recorder. Manipulating (e.g., pausing, rewinding, or forwarding) the position within the RTSB content stream from the remote video recorder does not affect buffering of the live content. The remote time shift buffer system provides pause live television functionality with little to no loss of content.

The client receives a live television signal from a television signal source (e.g., an over the air broadcast television network or a cable television provider) and outputs the signal to a television. The client includes a controller, a memory, a control interface, a network interface, and at least one tuner. The controller is in communication with the tuner, the network interface, the control interface, and the memory. The controller coordinates the operation of the client and executes client applications. The memory stores applications, operating values, and configurations for the client. The network interface connects the client to a network. Each tuner decodes the television signal corresponding to a selected television channel.

The remote video recorder includes a controller, a network interface, one or more tuners, and a memory. The controller is in communication with the tuners, the network interface, and the memory. The controller coordinates the operation of the client and executes applications. The network interface connects the client to the network. Each tuner selectively receives a channel in a signal from a television signal source. The memory of the remote video recorder stores applications, operating values, configurations, and digital video. A portion of the memory serves as a buffer for temporarily storing the live digital video content tuned using the client. Other portions of the memory are used for storing scheduled recordings. The remote video recorder may be embodied with one or more digital video recorders.

When the viewer input changes the channel and the client is displaying the live content from the television signal source, the remote time shift buffer system starts tracking the time spent on the channel. If the viewer remains on the channel for a selected length of time, the remote time shift buffer system attempts to buffer the live content. The amount of time before attempting to buffer the live content (i.e., the shadowing delay) is selected to avoid unnecessarily buffering content while the viewer is actively channel surfing (i.e., undesired content). A longer shadowing delay reduces the likelihood of starting a time shift buffer before the viewer selects a channel but reduces how far back the viewer can rewind. Conversely, a shorter delay begins buffering the content earlier but may result in more quickly aborted time shift buffer sessions.

The client sends a shadowing request to the remote video recorder. Upon receipt of the shadowing request, the remote video recorder determines whether sufficient resources are available. If sufficient resources are available, the remote video recorder tunes to same channel currently being viewed using the client and buffers the content to the memory. Even after the remote time shift buffer system successfully creates a buffer, the client continues displaying the live content until the viewer actively initiates a pause live television (PLTV) function, such pressing the pause button or the rewind button. At that point, there a natural discontinuity in the viewing experience and the client sends an action request to the remote video recorder.

The remote time shift buffer system takes advantage of the natural discontinuity to switch from the live television signal to the RTSB content stream. The remote time shift buffer system creates a RTSB content stream from the buffered content. If the RTSB content stream creation is successful, the remote video recorder notifies the client that the RTSB content stream is available. Next, the remote video recorder attempts to apply the PLTV function (i.e., pause, rewind, or forward) the RTSB content stream based on the action request. After receiving notification that the RTSB content stream is available, the client switches from the input receiving the live television signal to the RTSB content stream. As previously mentioned, the natural discontinuity typically masks any discontinuity resulting from the source swap. At this point, the viewer is watching the RTSB content stream from the remote video recorder. Because of client tuner shadowing, the remote time shift buffer system is capable of pausing live television at or near the point where the viewer pressed the pause button with little or no loss of content.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A remote time shift buffer system with shadow tuning is described herein and illustrated in the accompanying figures. The remote time shift buffer system includes a client in communication with a remote video recorder. The client tunes to a channel in a signal from a television signal source and sends the content to a television. When a pause live television (PLTV) function is initiated, the remote video recorder generates an independent RTSB content stream using the buffered content and publishes it for use by the client. Once the RTSB content stream is available, the client switches inputs and displays the RTSB content stream from the remote video recorder. Manipulating (e.g., pausing, rewinding, or forwarding) the position within the RTSB content stream from the remote video recorder does not affect buffering of the live television signal. The remote time shift buffer system provides PLTV functionality with little to no loss of content.

Figure 1:
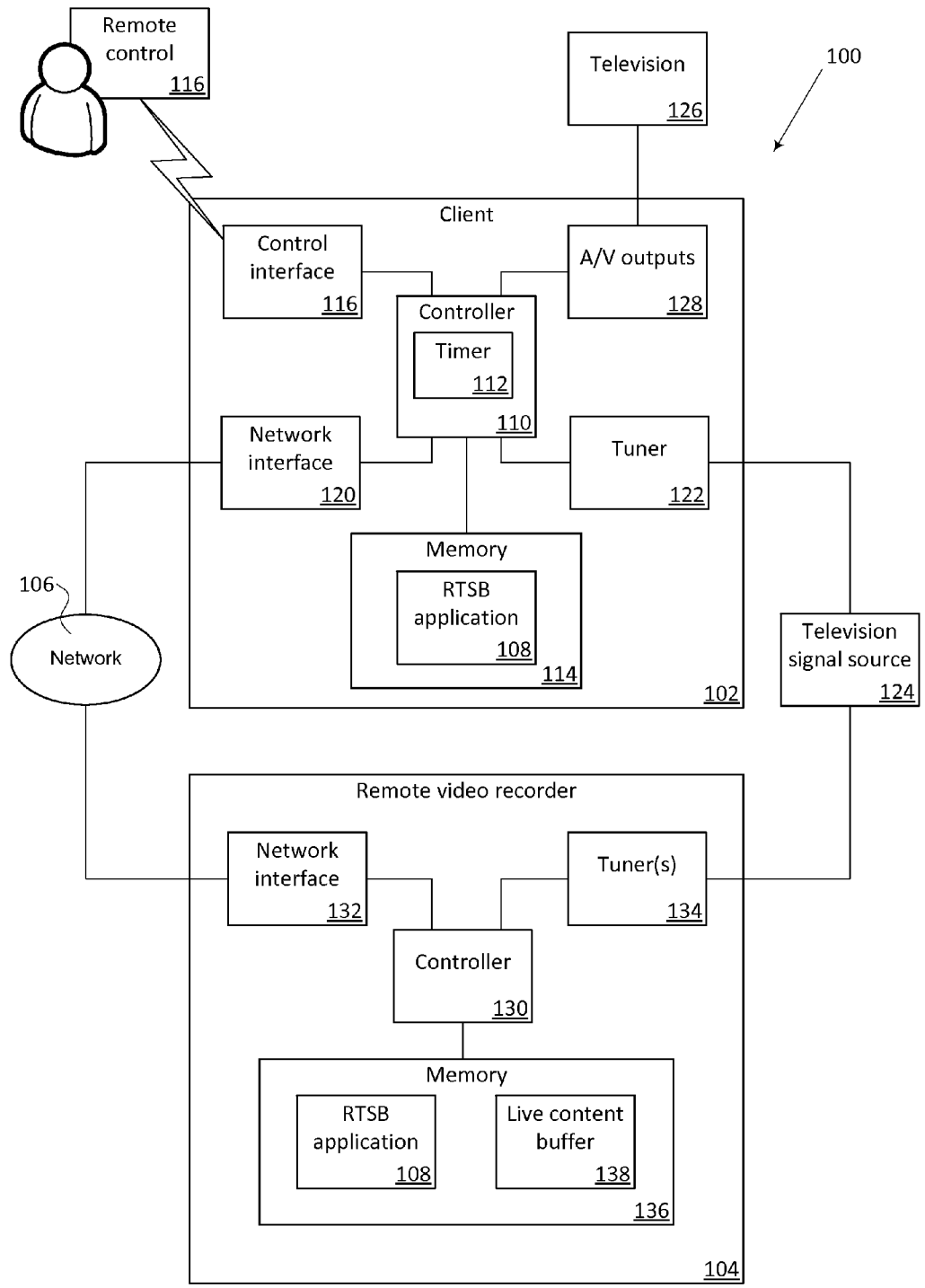
FIG. 1 is a simplified block diagram of one embodiment of the remote time shift buffer system with tuner shadowing.

FIG. 1 illustrates one embodiment of the remote time shift buffer system 100 providing pause live television functionality to a client without a local recording device. Pause live television functionality generally refers, but is not limited to, the ability to change (e.g., rewind or forward) or freeze (e.g., pause) the position of a live television signal and should not be construed as limiting the application of the remote time shift buffer in any way. The remote time shift buffer system 100 includes a client 102 and a remote video recorder 104.

The client 102 and the remote video recorder 104 are connectable to a network 106. In various embodiments, the network 106 is a local area network, a wide area network, or a combination thereof. The remote time shift buffer system 100 also includes a remote time shift buffer application 108. In various embodiments, the remote time shift buffer application 108 is a distributed application having components cooperatively executed by the client 102 and the remote video recorder 104.

The client 102 includes a controller 110, a memory 114, a control interface 116, a network interface 120, and a tuner 122. The controller 110 is in communication with the tuner 122, the network interface 120, the control interface 116, and the memory 114. The controller 100 coordinates the operation of the client and executes client applications including, but not limited to, the remote time shift buffer application 108. The controller 110 includes a camping timer 112 used to monitor the length of time the client 102 is tuned to a television channel. The count based on the timer is reset after each channel change. The control interface 116 allow a viewer to operate the client (e.g., change channels) either locally (i.e., at the client 102) or remotely (e.g., using a remote control 116). The memory 114 stores applications, operating values, and configurations for the client including, but not limited to, the remote time shift buffer application 108. The network interface connects the client to the network 106. The tuner 122 selectively receives a channel from a live television signal provided by a television signal source 124 (e.g., an over the air broadcast television network or a cable television provider) and outputs the signal to a television 126 (e.g., via audio/video output connectors). Examples of suitable clients include, but are not limited to, cable television receivers (set-top boxes) and smart televisions, either alone or in combination with a cable card.

The remote video recorder 104 includes a controller 130, a network interface 132, one or more tuners 134, and a memory 136. The controller 130 is in communication with the tuners 134, the network interface 132, and the memory 136. The controller 130 coordinates the operation of the remote video recorder 104 and executes applications including, but not limited to, the remote time shift buffer application 108. The network interface 132 connects the remote video recorder 104 to the network 106. Each tuner 134 selectively receives a channel in a signal from a television signal source 124. The memory 136 of the remote video recorder stores applications, operating values, configurations, and digital video including, but not limited to, the remote time shift buffer application 108. At least a portion of the memory serves as a live content buffer 138 for temporarily storing the live television content tuned using the client and to provide a buffered content stream used when playing back the contents of the live content buffer. Other portions of the memory may be used for storing scheduled recordings.

As a practical matter, many currently available digital video recorders include multiple tuners and are capable of simultaneously recording content using multiple tuners. The remote time shift buffer system is operable provided that one unused secondary tuner is available. The availability of multiple tuners in the remote video recorder is not a requirement of the remote time shift buffer system. The inclusion of multiple tuners in the remote video recorder increases the likelihood that an unused tuner will available for use by the remote time shift buffer application. In some embodiments, the remote time shift buffer system is provided with a tuner and video storage memory dedicated to PLTV functionality and not available for scheduled recording functionality.

The remote video recorder may be embodied with one or more digital video recorders. Suitable digital video recorders for use in the remote video recorder include local digital video recorders and network digital video recorders. In some embodiments, the remote video recorder includes a single network digital video recorder. In other embodiments, the remote video recorder includes multiple network digital video recorders.

In still other embodiments, the remote video recorder is a decentralized pool of digital video recorders. The client broadcasts the shadowing request to the members of the pool. Members of the pool capable of satisfying the request respond to the client. In some embodiment, the responding members of the pool are temporarily unavailable to handle requests from other clients unless released. The client then negotiates with one of the pool members who responded to actually set up the tuner shadowing and remote time shift buffer. In some embodiments, the client contemporaneously declines the responses from the other responding pool members. In some embodiments, responding pool members not contacted by the client within a selected length of time become available to other clients once again.

In still other embodiments, the remote video recorder includes a front end server that manages one or more digital video recorders as group. The front end server appears as a single digital video recorder eliminating the need to configure the client for each individual digital video recorder. When a request is received from a client, the front controller allocates available resources (e.g., tuners and memory) from the attached group of digital video recorders to fulfill the request on behalf of the client. The front end server may be part of a digital video recorder or a separate component. Local digital video recorders may be used with the front end server because the front end server handles external communications with the client and repackages, retransmits, encodes, and/or performs any other necessary or desirable processing on the data from the local digital video recorder.

In still other embodiments, the remote video recorder includes remote tuners and/or memory provided as part of a digital video recording service. Such digital video recording services may be offered by cable companies and use remote banks of tuners and associated memory maintained by the provider to record content on demand by customers. The number of tuners and amount of storage allocated to each customer is determined by the level of service purchased by the customer.

Figure 2A:
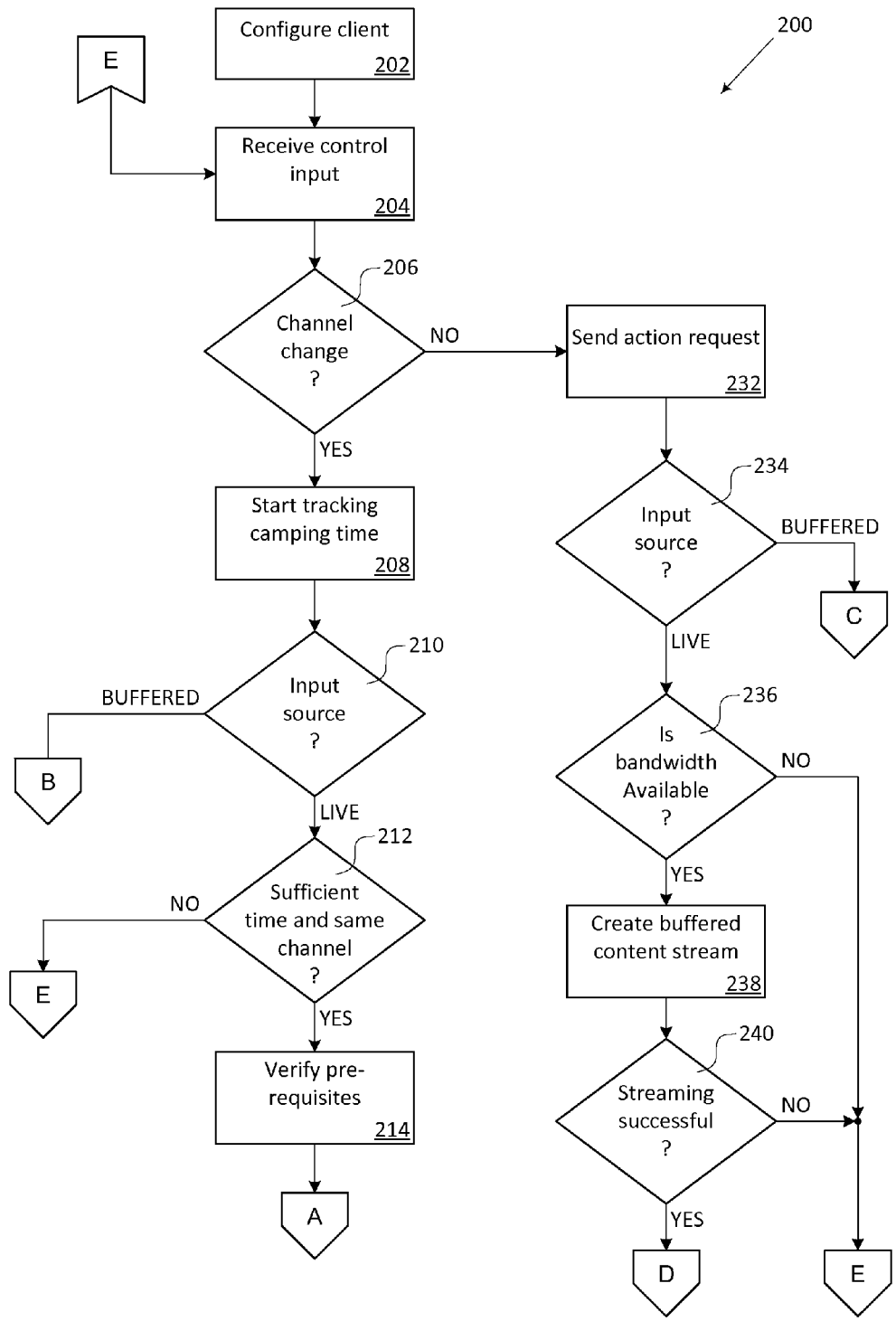
FIGS. 2A and 2B are a flowchart of one embodiment of the simplified method performed by the remote time shift buffer application.
Figure 2B:
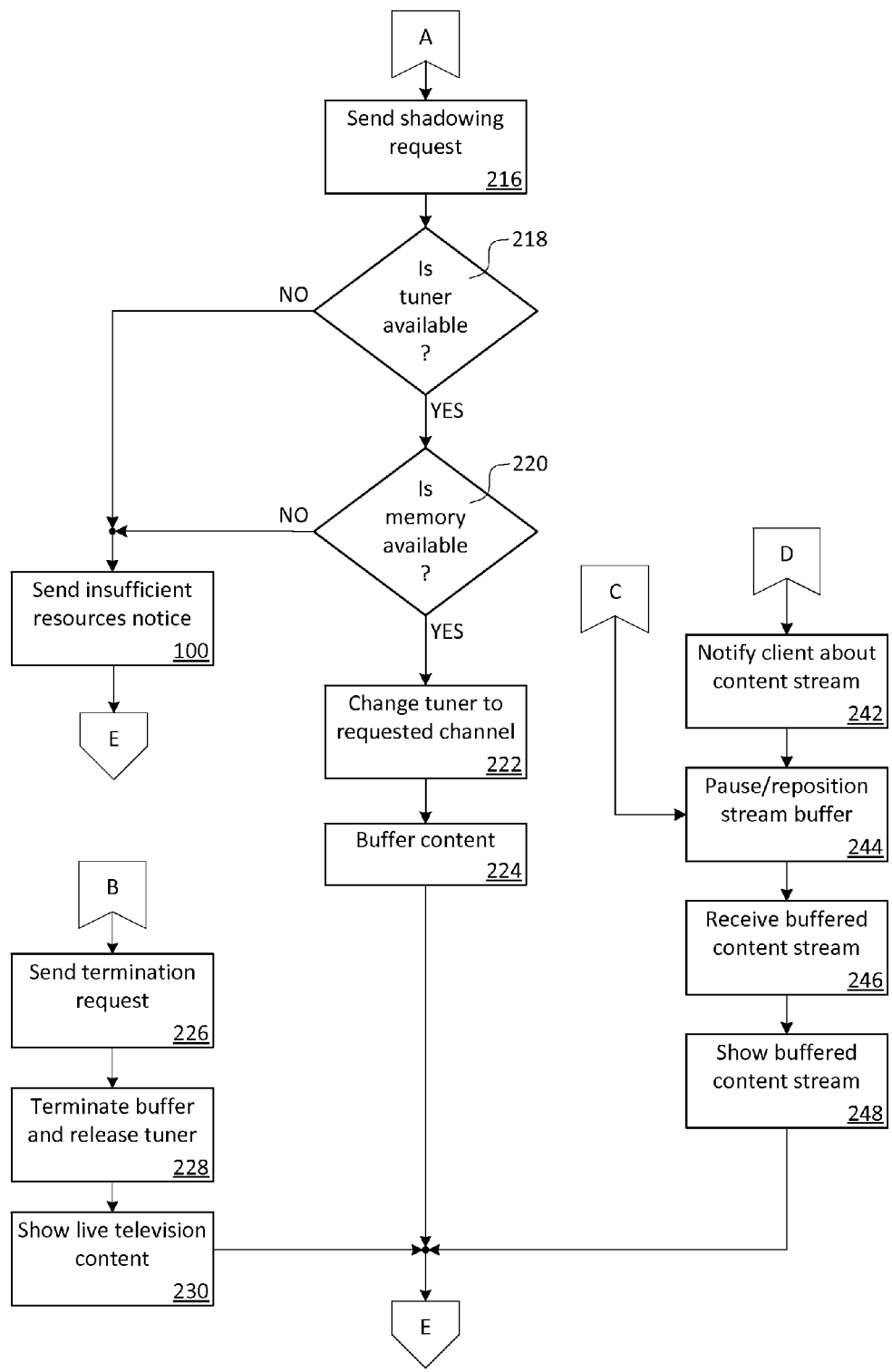

FIGS. 2A and 2B illustrate one embodiment of a simplified method 200 executed by the remote time shift buffer application to establish a remote time shift buffer using shadow tuning. Initially, the remote time shift buffer system is configured 202. At a minimum, configuration pairs a client with a remote video recorder. In some embodiments, the client is configured with a single remote video recorder to implement the PLTV functionality. The paired remote video recorder handles the remote time shift buffer for the client. Once paired, the remote time shift buffer system monitors viewer inputs. Selected viewer inputs are linked to functions of the remote time shift buffer system. Examples of viewer inputs often linked to functions of the remote time shift buffer system include, but are not limited to, changing channels, starting or stopping recording, and other operations modifying the RTSB content stream (i.e., pausing, rewinding, and forwarding).

Next, the client receives control inputs 204 from the viewer. For some control inputs, the response of the remote time shift buffer system depends on the input source currently being output by the client. When the viewer input changes the channel 206, the remote time shift buffer system starts tracking the time spent on the channel 208 (i.e., camping time). If the client is displaying the live content 210 from the television signal source and remains on the channel for a selected length of time 212, the remote time shift buffer system attempts to buffer the live content.

The amount of time before attempting to buffer the live content (i.e., the shadowing delay) is selected to avoid unnecessarily buffering content while the viewer is actively channel surfing (i.e., undesired content). The shadowing delay is directly related to the start time of the time shift buffer. A longer shadowing delay reduces the likelihood of starting a time shift buffer before the viewer selects a channel but reduces how far back the viewer can rewind. Conversely, a shorter delay begins buffering the content earlier but may result in more quickly aborted time shift buffer sessions. For example, a suitable shadowing delay may be adjustable in range from about 1 second to about 30 seconds with a typical shadowing delay being about 10 seconds. Shadowing delays longer than 30 seconds are possible but may be longer than necessary to avoiding shadowing while the viewer is channel surfing while unnecessarily limiting how soon the content can be paused or how far back the content can be rewound.

The remote time shift buffer system optionally determines whether all pre-requisites are met 214. Examples of pre-requisite checks performed by the remote time shift buffer system include, but are not limited to, verification the client is paired with a remote video recorder, verification the paired remote video recorder is available (i.e., online), and verification remote time shift buffering is activated on the client. If all pre-requisites are not satisfied, the remote time shift buffer system returns to processing viewer inputs. If all pre-requisites are satisfied (or no pre-requisite check is required), the client sends a shadowing request to the remote video recorder 216. In some embodiments, the shadowing request specifies the current channel tuned by the client. In other embodiments, the channel information is provided to the remote video recorder in a subsequent message.

Upon receipt of the shadowing request, the remote video recorder determines whether sufficient resources are available. In some embodiments, the remote video recorder checks for an available tuner 218. In various embodiments, the remote video recorder also checks for sufficient memory to buffer a minimum amount of live content 220. If the resources are not available to the remote video recorder, the response of the remote time shift buffer system varies depending upon the embodiment. In some embodiments, live buffering silently fails when the resources are not available. In other embodiments, live buffering fails and the remote time shift buffer system notifies the viewer of the failure. In still other embodiments, the remote time shift buffer system provides the viewer with information about the activity of the tuners and/or previously recorded content occupying the memory and offers the viewer an option to select a tuner and/or delete previously recorded content to free up memory for use by the remote time shift buffer system or to forego the remote time shift buffer.

If sufficient resources are available (or freed-up by viewer selection), the remote video recorder tunes to the same channel currently being viewed using the client 222. In other words, the recorder shadows the tuner usage of the client. After shadowing the client tuner, the remote video recorder buffers the content to the video storage memory for later use 224. In some embodiments, the remote video recorder sends a message informing the client whether or not the live content is being buffered. In some embodiments, the recorder sends the response before shadowing the client tuner. In some embodiments, the recorder sends the response after successfully shadowing the client tuner but before starting to buffer the content. In other embodiments, the recorder sends the response after successfully starting to buffer the content.

Returning to the viewer input activity, when the viewer input changes the channel and the client is displaying the buffered content from the remote video recorder, the client 222 sends a buffer termination request to the remote video recorder 226 and starts tracking the time spent on the channel. Upon receipt of the buffer termination request, the remote video recorder stops buffering the content, discards the buffer content, and releases the tuner. After terminating the existing buffer, the remote time shift buffer system continues normal operation, switches to the live television content 230, and starts the process to create a new live content buffer if the viewer remains on a channel for the selected length of time.

Even after the remote time shift buffer system successfully creates a buffer, the client continues using the local tuner until the viewer activates selected features of the remote time shift buffer system, such as pressing the pause button or the rewind button. At that point, there is a natural discontinuity in the viewing experience. The remote time shift buffer system takes advantage of the natural discontinuity to switch from the live television signal to the RTSB content stream.

If the viewer input is something other than a channel change, the client is displaying the live content from the television signal source, and the remote video recorder is actively buffering the live content, the remote time shift buffer system attempts to perform a content swap. The content swap is begun when the client sends an action request to the remote video recorder.

In some embodiments, the remote time shift buffer system determines whether sufficient bandwidth is available to stream the content buffered by the remote video recorder. If sufficient bandwidth is not available, there is no need to allocate resources to stream the buffered content. In some embodiments, the remote time shift buffer system silently terminates the buffer operation due to insufficient bandwidth. In some embodiments, the remote time shift buffer system terminates the buffer operation due to insufficient bandwidth and notifies the viewer of the termination. In other embodiments, the remote time shift buffer system retains the buffer and notifies the viewer that insufficient bandwidth is available to use the functionality of remote time shift buffer. In still other embodiments, the remote time shift buffer system provides the viewer with information about bandwidth usage and offers the viewer an option to terminate a selected bandwidth usage to enable viewing of the buffered content.

If sufficient bandwidth is available (or released), the remote time shift buffer system creates a RTSB content stream from the buffered content synchronized with the live television content. If the RTSB content stream creation is successful, the remote video recorder notifies the client that the RTSB content stream is available 240. Next, the remote video recorder attempts to adjust playback of the RTSB content stream based on the PLTV function specified in the action request 242. For example, the remote video recorder pauses, rewinds, or moves forward through the RTSB content stream relative.

Some embodiments allow the viewer to return to the live point, for example, by pressing the stop button or the live button. In various embodiments, returning to the live point simply moves to the end of the RTSB content stream so the buffered content is contemporaneous with the live content. In other embodiments, returning to the live point causes the client to switch back to the live content from the television signal source and optionally terminates the buffer. For example, pressing the stop button may return the viewer to the live point and terminate the buffer while pressing the live button only returns the viewer to the live point. It should be appreciated that some action requests will have no effect in some situations. For example, a forward action cannot move the position of the buffered content past the current position of the live content.

Some embodiments allow the viewer to save the remote time shift buffer, for example, by pressing the record button. This elevates the remote time shift buffer to a non-temporary status. The remote time shift buffer continues storing the live television content while the client remains tuned to the same channel and there is available memory in the remote video recorder. The elevated remote time shift buffer is retained (e.g., until deleted by a viewer) despite events that would normally result in termination of the remote time shift buffer (e.g., changing channels or starting a scheduled recording).

After receiving notification that the RTSB content stream is available 244, the client acquires the RTSB content stream 246. Once acquired, the client sends the RTSB content stream to the television instead of the live television content 248. As previously mentioned, the natural discontinuity typically masks any discontinuity resulting from the source swap. At this point, the viewer is watching the RTSB content stream from the remote video recorder. In various embodiments, the manipulation of the RTSB content stream occurs after the switch. In other embodiments, the manipulation of the RTSB content stream occurs prior to the switch.

If the viewer input is something other than a channel change and the client is displaying the live content from the television signal source, the remote time shift buffer system skips the shadowing delay sequence and immediately attempts to buffer the content as described above. In such situations, there will typically be a noticeable delay before the selected PLTV function occurs due to the time needed to request, allocate, and activate the shadow tuner and remote time shift buffer. In various embodiments, the live content is hidden from the viewer while the remote time shift buffer system attempts to initiate the selected PLTV function the remote time shift buffer. In some embodiments, the content is hidden by blanking the screen or otherwise temporarily suppressing the output of the live content until the PLTV action is completed. In other embodiments, the remote time shift buffer system displays a graphic or animation that covers or hides the live content until the PLTV action is completed. In some embodiments, the graphic or animation displays a message informing the viewer that it is attempting to initiate the selected PLTV function when the viewer attempts to use PLTV functionality and the remote time shift buffer is not active. The message provides reassurance that the remote time shift buffer system is working to perform the selected PLTV function and discourages the viewer from repeatedly trying to invoke selected PLTV function.

In various embodiments, the remote time shift buffer system notifies the viewer when the live television buffer is active and there are no available tuners to handle a scheduled recording that is about to begin. When the live television buffer is active and there are no available tuners to handle a scheduled recording that is about to begin, some embodiments silently terminate the remote time shift buffer to release the tuner for the scheduled recording. Other embodiments terminate the remote time shift buffer to release the tuner for the scheduled recording and notify the viewer of the termination. In still other embodiments, the remote time shift buffer system provides the viewer with information about the activity of the tuners and offers the viewer an option to forego the previously scheduled recording or terminate the remote time shift buffer.

Various embodiments of the remote time shift buffer system respond differently when the remote video recorder cannot accommodate the remote time shift buffer request due to insufficient resources (e.g., the lack of an available tuner or sufficient memory). After receiving a message that the attempt was unsuccessful, some embodiments do not make further attempt to initiate buffering of the live content again until the viewer changes channels or initiates a PLTV function. In other embodiments, the client periodically resends the shadowing request until the remote video recorder successfully shadows the client tuner and buffers the live content. In still other embodiments, the remote video recorder periodically checks resource availability after receiving a shadowing request that cannot be fulfilled and notifies the client when the request is fulfilled.

In various embodiments, the remote time shift buffer system is also integrated into the startup and shutdown processes of the client 222. In some embodiments, the normal shutdown process of the client includes sending a buffer termination request to the remote video recorder to release the resources no longer need by the remote time shift buffer system. Some embodiments of the remote time shift buffer system start tracking the camping time following startup of the client and attempt to buffer the live content if the threshold camping time is reached. This provides automatic live content buffering in situations where the client is turned on (i.e., powers up) and no additional viewer input is received. For example, the viewer may simply begin watching whatever is on the starting channel used by the client upon startup (e.g., a default channel or the last tuned channel).

In various embodiments, the remote time shift buffer system includes fault tolerance functionality. An example of a fault is the situation where the remote video recorder receives a shadowing request from a client while the remote video recorder is already buffering content for that same client. Examples of such situations include, but are not limited to, a software crash or a power loss that results in an unexpected reboot or shutdown bypassing the normal shutdown process. The remote video recorder buffering the live content will not be aware that the client has suffered a fault and will continue to buffer the live content because no termination request was received. After rebooting or being turned back on, the client sends a shadowing request to the remote video recorder. If the remote video recorder were to simply process the shadowing request and had available resources, duplicate buffers for the same client would be active.

To provide fault tolerance, some embodiments of the remote time shift buffer system compare a client identifier in the shadowing request to the client identifier associated with each live content buffer being handled by the remote video recorder. If an active live content buffer has the same client identifier as the shadowing request, the remote video recorder compares the details of the shadowing request to the details of that live content buffer. If that live content buffer is already capturing the content from the channel identified in the shadowing request, the remote video recorder associates that existing live content buffer with the new shadowing request. By maintaining the existing live content buffer, the viewer has the capability to review the live content missed during the fault.

If the existing live content buffer associated with the client is capturing content from a different channel than the channel identified in the shadowing request, the remote time shift buffer system terminates the existing live content buffer and creates a new live content buffer. In various embodiments, the live content buffer replacement sequence defaults to first terminating the existing live content buffer and then creating the new live content buffer without regard to resource availability or other considerations. In other embodiments, the remote video recorder prioritizes the operations of the live content buffer replacement sequence. In some embodiments, the operations of the live content buffer replacement sequence are prioritized based on the availability of resources. If sufficient resources are available, the remote video recorder creates the new live content buffer first to maximize the live content captured. Once the new live content buffer is established, the remote video recorder then terminates the existing live content buffer. If sufficient resources are not available, the remote video recorder first terminates the existing live content buffer to free up those resources before creating the new live content buffer.

In still other embodiments, the prioritization of the operations of the live content buffer replacement sequence is broken down to the tuner shadowing and live content buffer creation operations. For example, the remote video recorder may have adequate storage space for the new live content buffer but not have a tuner available. In this case, the remote video recorder first reallocates the tuner used by the existing live content buffer to the new live content buffer and shadows the channel currently tuned by the client using the reallocated tuner. Next, the remote video recorder begins storing the live content tuned using the reallocated tuner in a new live content buffer. Finally, once the new live content buffer is operational, the remote video recorder discards the existing live content buffer.

Because of client tuner shadowing, the remote time shift buffer system is capable of pausing live television at or near the point where the viewer pressed the pause button with little or no loss of content. Some embodiments of the remote time shift buffer system back up a selected number of frames or a selected length of time in the RTSB content stream when pausing to account for the processing time involved. In other embodiments, the remote time shift buffer system measures the time from when the pause button is pressed until the display stream is paused. Accounting for processing time is useful but not necessary as the response time of the remote time shift buffer system approaches real time and the buffer allows the viewer to rewind to a spot before the pause point. Most content streams do not have a frame indexing system that allows identification of the exact frame. Indexing is typically intended for the viewer and done using time measured in seconds. Conventional broadcast video content typically has frame rates of approximately 24 frames per second or more, locating an exact frame using time is a complex and inexact process. Despite the lack of precision indexing, processing time accounting typically allows the remote time shift buffer system to get close enough for a satisfactory viewer experience.

Figure 3:
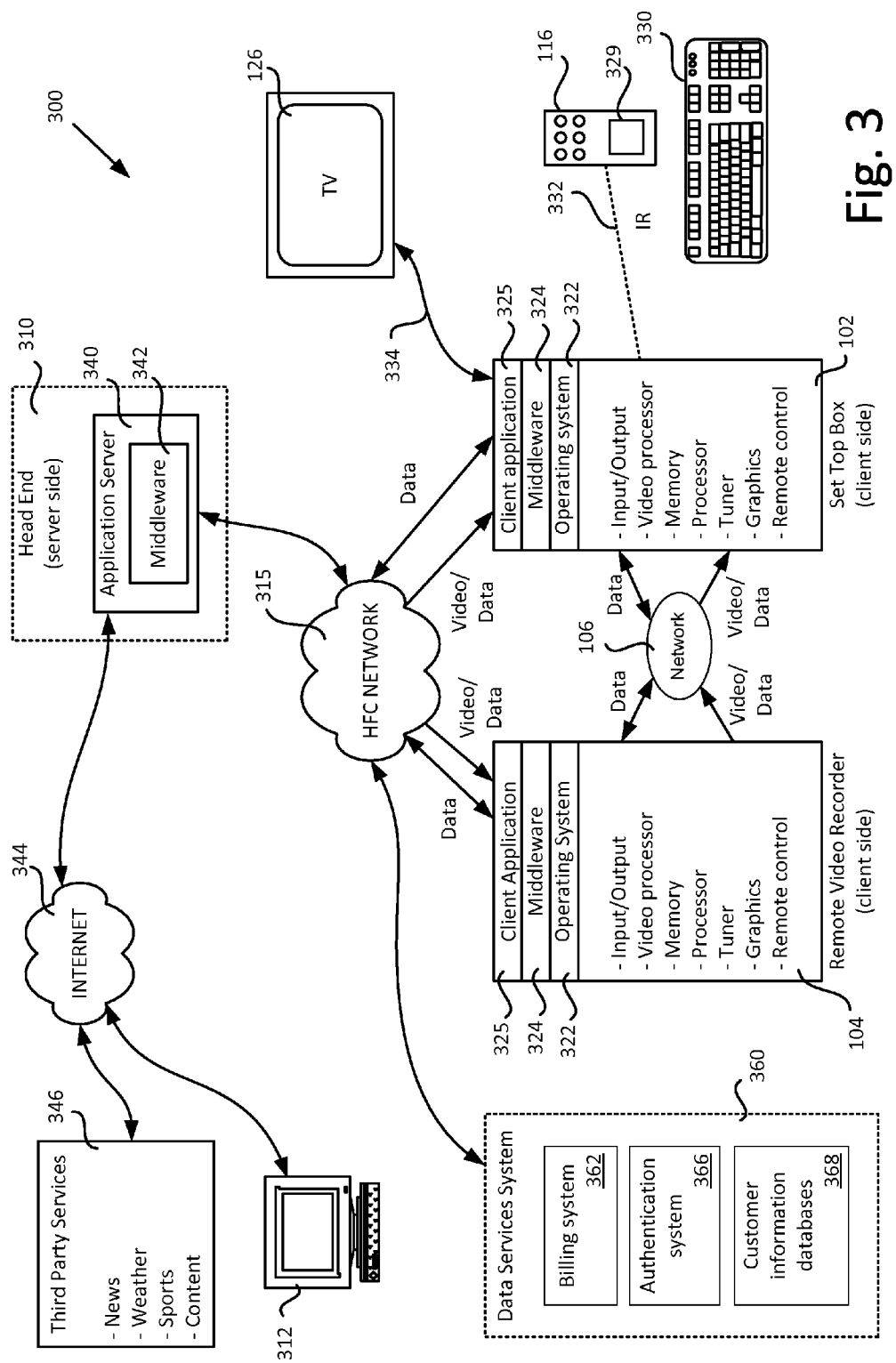
FIG. 3 is a simplified block diagram illustrating a cable television services system architecture providing an operating environment according to an embodiment.

FIG. 3 is a simplified block diagram illustrating a cable television services system 300 (hereafter referred to as "CATV") architecture providing an operating environment according to an embodiment. As should be appreciated, a CATV services system 300 is but one of various types of systems that may be utilized for providing an operating environment for providing a remote time shift buffer. Referring now to FIG. 3, digital and analog video programming, information content and interactive television services are provided via a hybrid fiber coax (HFC) network 315 to a television set 126 for consumption by a cable television/services system customer. As is known to those skilled in the art, HFC networks 315 combine both optical fiber and coaxial cable lines. Typically, optical fiber runs from the cable head end 310 to neighborhoods of subscribers. Coaxial cable runs from the optical fiber feeders to each customer or subscriber. The functionality of the HFC network 315 allows for efficient bidirectional data flow between the client-side set-top box 102, the remote video recorder 104, and the server-side application server 340 of the embodiment.

The CATV system 300 is in the form of a distributed client-server computing system for providing video and data flow across the HFC network 315 between server-side services providers (e.g., cable television/services providers) via a server-side head end 310, the remote video recorder 104, and a client-side customer via the client 102 functionally connected to a customer receiving device 126, such as the television set. As is understood by those skilled in the art, modern CATV systems 300 may provide a variety of services across the HFC network 315 including traditional digital and analog video programming, telephone services, high speed Internet access, video-on-demand, and information services.

On the client side of the CATV system 300, digital and analog video programming and digital and analog data are provided to the customer television set 126 via the client 102. Interactive television services that allow a customer to input data to the CATV system 300 likewise are provided by the client 102. As illustrated in FIG. 3, the client 102 and the remote video recorder 104 are multipurpose computing devices having a computer processor, memory, and an input/output mechanism. The input/output mechanism receives input from server-side processes via the HFC network 315 and from customers via input devices such as the remote control device 116, keyboard 330, or other computing device 312, such as a smart phone, a personal computer (e.g., a laptop or desktop), a tablet/slate computer, etc. The remote control device 116 and the keyboard 330 may communicate with the client 102 via a suitable communication transport such as the infrared connection 332. The remote control device 116 may include a biometric input module 329. The client 102 also includes a video processor for processing and providing digital and analog video signaling to the television set 126 via a cable communication transport 334. A multi-channel tuner is provided for processing video and data to and from the client 102 and the server-side head end system 310, described below.

The client 102 and the remote video recorder 104 also include an operating system 322 for directing the functions of the client 102 in conjunction with a variety of client applications 325. For example, if a client application 325 requires a news flash from a third-party news source to be displayed on the television set 126, the operating system 322 may cause the graphics functionality and video processor of the client 102, for example, to output the news flash to the television set 126 at the direction of the client application 325 responsible for displaying news items.

Because a variety of different operating systems 322 may be utilized by a variety of different brands and types of set-top boxes, a middleware layer 324 may be provided to allow a given software application to be executed by a variety of different operating systems. According to an embodiment, the middleware layer 324 may include a set of application programming interfaces (APIs) that are exposed to client applications 325 and operating systems 322 that allow the client applications to communicate with the operating systems through common data calls understood via the API set. As described below, a corresponding middleware layer is included on the server side of the CATV system 300 for facilitating communication between the server-side application server 340, the remote video recorder 104, and the client-side set-top box 102. The middleware layer 342 of the server-side application server 340 and the middleware layers 324 of the client-side set-top box 102 and the remote video recorder 104 may format data passed between the client side and server side according to the Extensible Markup Language (XML).

According to one embodiment, the client 102 passes digital and analog video and data signaling to the television set 126 via a one-way communication transport 334. According to other embodiments, two-way communication transports may be utilized, for example, via high definition multimedia (HDMI) ports. The client 102 may receive video and data from the server side of the CATV system 300 via the HFC network 315 through a video/data downlink and data via a data downlink or from the remote video recorder 104. The client 102 may transmit data from the client side of the CATV system 300 to the server side of the CATV system 300 via the HFC network 315 via one data uplink. The video/data downlink is an "in band" downlink that allows for digital and analog video and data signaling from the server side of the CATV system 300 through the HFC network 315 to the client 102 for use by the client 102 and for distribution to the television set 126. As is understood by those skilled in the art, the "in band" signaling space operates at a relative high frequency, e.g., between 54 and 1000 megahertz. The signaling space is generally divided into channels which may be transmitted as a single analog signal or a greater number (e.g., ten) of digital signals.

The data downlink and the data uplink, illustrated in FIG. 3, between the HFC network 315 and the client 102 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 102 and the server-side application server 340 is typically passed through the "out of band" data links. Alternatively, an "in band" data carousel may be positioned in an "in band" channel into which a data feed may be processed from the server-side application server 340 through the HFC network 315 to the client-side set-top box 102. Operation of data transport between components of the CATV system 300, described with reference to FIG. 3, is well known to those skilled in the art.

Referring still to FIG. 3, the head end 310 of the CATV system 300 is positioned on the server side of the CATV system and includes hardware and software systems responsible for originating and managing content for distributing through the HFC network 315 to client-side set-top boxes 102 for presentation to customers via televisions. As described above, a number of services may be provided by the CATV system 300, including digital and analog video programming, interactive television services, telephone services, video-on-demand services, targeted advertising, and provision of information content.

The application server 340 is a general-purpose computing system operative to assemble and manage data sent to and received from the client-side set-top box 102 via the HFC network 315. As described above with reference to the client 102, the application server 340 includes a middleware layer 342 for processing and preparing data from the head end of the CATV system 300 for receipt and use by the client-side set-top box 102. For example, the application server 340 via the middleware layer 342 may obtain data from third-party services 346 via the Internet 344 for transmitting to a customer through the HFC network 315 and the set-top box 102. For example, content metadata a third-party content provider service may be downloaded by the application server via the Internet 344. When the application server 340 receives the downloaded content metadata, the middleware layer 342 may be utilized to format the content metadata for receipt and use by the client 102. Therefore, content metadata may be sent and categorized based on the availability to the customer's program guide data.

According to one embodiment, data obtained and managed by the middleware layer 342 of the application server 340 is formatted according to the Extensible Markup Language and is passed to the client 102 through the HFC network 315 where the XML-formatted data may be utilized by a client application 325 in concert with the middleware layer 324, as described above. As should be appreciated by those skilled in the art, a variety of third-party services data, including news data, weather data, sports data and other information content may be obtained by the application server 340 via distributed computing environments such as the Internet 344 for provision to customers via the HFC network 315 and the client 102. According to embodiments, client application 325 may include the remote time shift buffer application 108 described herein.

According to embodiments, the application server 340 obtains customer support services data, including billing data, information on customer work order status, answers to frequently asked questions, services provider contact information, and the like from data services 360 for provision to the customer via an interactive television session. As illustrated in FIG. 3, the services provider data services 360 include a number of services operated by the services provider of the CATV system 300 which may include data on a given customer.

A billing system 362 may include information such as a customer's name, street address, business identification number, Social Security number, credit history, and information regarding services and products subscribed to by the customer. According to embodiments, the billing system 362 may also include billing data for services and products subscribed to by the customer for bill processing, billing presentment, and payment receipt.

A customer information database 368 may include general information about customers such as place of employment, business address, business telephone number, and demographic information such as age, gender, educational level, and the like. The customer information database 368 may also include information on pending work orders for services or products ordered by the customer. The customer information database 368 may also include general customer information such as answers to frequently asked customer questions and contact information for various service provider offices/departments. As should be understood, this information may be stored in a variety of disparate databases operated by the cable services provider.

An authentication system 366 may include information such as secure user names, subscriber profiles, subscriber IDs, and passwords utilized by customers for access to network services. As should be understood by those skilled in the art, the disparate systems 350, 362, 366, 368 may be integrated or provided in any combination of separate systems, wherein FIG. 3 shows only one example.

Figure 4:
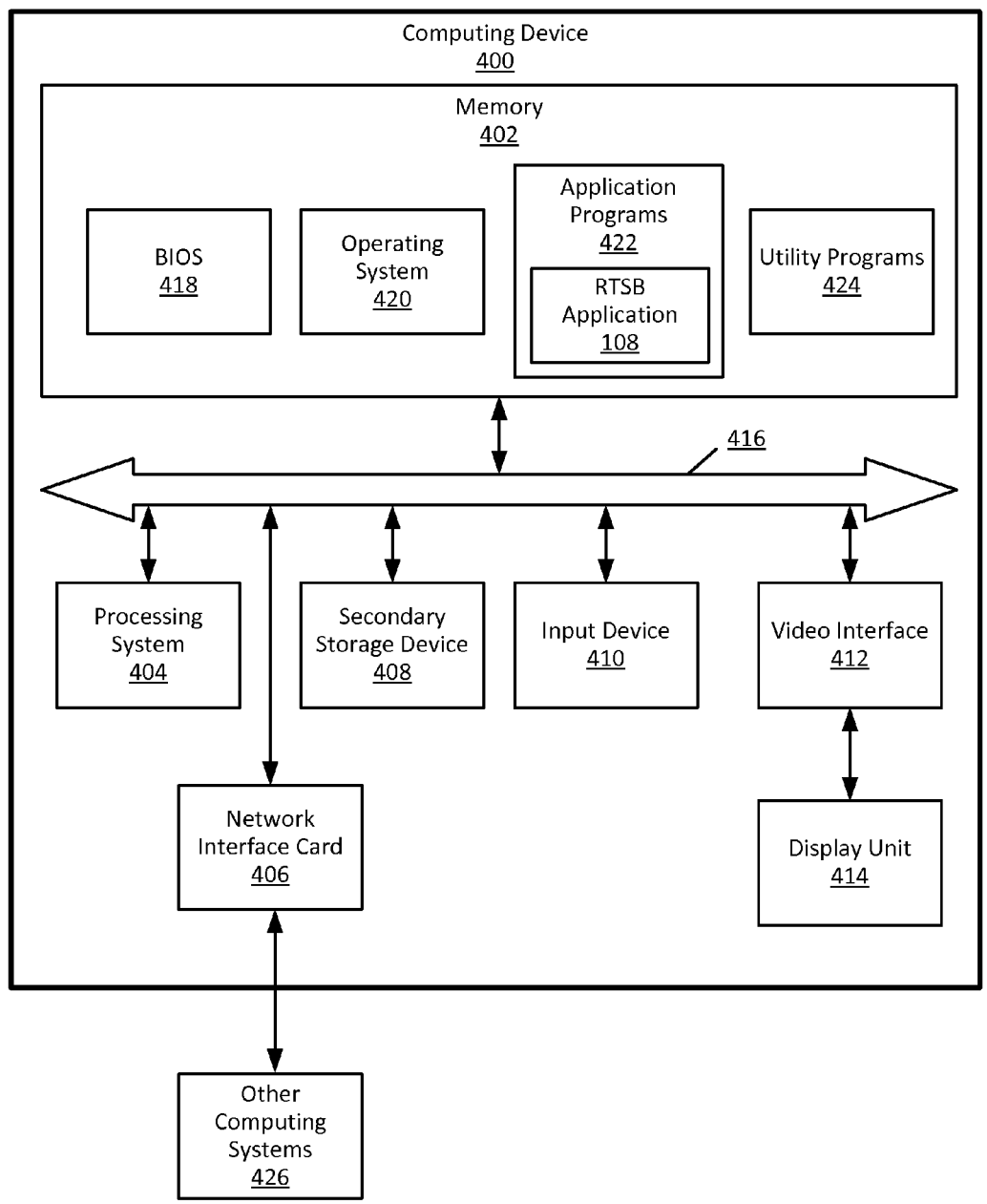
FIG. 4 is a simplified block diagram illustrating example physical components of a computing device with which embodiments may be practiced.

FIG. 4 is a simplified block diagram illustrating example physical components of a computing device 400 with which embodiments may be practiced. In some embodiments, one or a combination of the components of system 100 may be implemented using one or more computing devices like the computing device 400. It should be appreciated that in other embodiments, components of system 100 may be implemented using computing devices having hardware components other than those illustrated in the example of FIG. 4.

Computing devices may be implemented in different ways in different embodiments. For instance, in the example of FIG. 4, the computing device 400 includes a processing system 404, memory 402, a network interface 406, a secondary storage device 408, an input device 410, a video interface 412, a display unit 414, and a communication medium 416. In other embodiments, the computing device 400 may be implemented using more or fewer hardware components (e.g., a video interface, a display unit, or an input device) or in combination with other types of computer systems and program modules 426.

The memory 402 includes one or more computer-readable storage media capable of storing data and/or computer-executable instructions. According to one embodiment, the remote time shift buffer application 108 may be stored locally on computing device 400. Memory 402 thus may store the computer-executable instructions that, when executed by processor 404, cause the remote time shift buffer application 108 to allow a client to provide the pause live television functionality described above with reference to FIGS. 1-2.

In various embodiments, the memory 402 is implemented in various ways. For example, the memory 402 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 404 includes one or more processing units, which may include tangible integrated circuits that selectively execute computer-executable instructions. In various embodiments, the processing units in the processing system 404 are implemented in various ways. For example, the processing units in the processing system 404 can be implemented as one or more processing cores. In this example, the processing system 404 can comprise one or more Intel Core microprocessors. In another example, the processing system 404 can comprise one or more separate microprocessors. In yet another example embodiment, the processing system 404 can comprise Application-Specific Integrated Circuits (ASICs) that provide specific functionality. In yet another example, the processing system 404 provides specific functionality by using an ASIC and by executing computer-executable instructions.

The computing device 400 may be enabled to send data to and receive data from a communication network via a network interface card 406. In different embodiments, the network interface card 406 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 408 includes one or more computer-readable storage media, and may store data and computer-executable instructions not directly accessible by the processing system 404. That is, the processing system 404 performs an I/O operation to retrieve data and/or computer-executable instructions from the secondary storage device 408. In various embodiments, the secondary storage device 408 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 410 enables the computing device 400 to receive input from a user. Example types of input devices include, but are not limited to, keyboards, mice, trackballs, stylus input devices, key pads, microphones, joysticks, touch-sensitive display screens, and other types of devices that provide user input to the computing device 400.

The video interface 412 outputs video information to the display unit 414. In different embodiments, the video interface 412 is implemented in different ways. For example, the video interface 412 is a video expansion card. In another example, the video interface 412 is integrated into a motherboard of the computing device 400. In various embodiments, the display unit 414 can be a an LCD display panel, a touch-sensitive display panel, an LED screen, a projector, a cathode-ray tube display, or another type of display unit. In various embodiments, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 416 facilitates communication among the hardware components of the computing device 400. In different embodiments, the communications medium 416 facilitates communication among different components of the computing device 400. For instance, in the example of FIG. 4, the communications medium 416 facilitates communication among the memory 402, the processing system 404, the network interface card 406, the secondary storage device 408, the input device 410, and the video interface 412. In different embodiments, the communications medium 416 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory 402 also stores one or more application programs 422 that, when executed by the processing system 404, cause the computing device 400 to provide applications to users, for example, the remote time shift buffer application 108. The memory 402 also stores one or more utility programs 424 that, when executed by the processing system 404, cause the computing device 400 to provide utilities to other software programs.

Embodiments of the present invention may be utilized in various distributed computing environments where tasks are performed by remote processing devices that are linked through a communications network in a distributed computing environment.

Embodiments, for example, are described above with reference to flowcharts and/or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A remote time shift buffer system comprising:
a client connected to a television, said client receiving a plurality of television channels, each television channel carrying live television content; and
a remote video recorder in communication with said client, said remote video recorder receiving the plurality of television channels;
said client operable to:
tune to a television channel for a live television program selected from said plurality of television channels;
determine an amount of time spent on said television channel;
send a shadowing request to said remote video recorder when said amount of time spent on said television channel is greater than a selected amount of time; and
send an action request to said remote video recorder in response to a function input to said live television program;
while said remote video recorder buffers said live television program, output the live television program to the television prior to receiving said function input; and
during the live television program, output a buffered content stream received from said remote video recorder to the television;
said remote video recorder executing a remote time shift buffer application operable to:
tune to said television channel of said live television program in response to said shadowing request; and
buffer said live television program from said television channel as buffered live television content in response to said shadowing request;
generate said buffered content stream from said buffered lived television program in response to said action request; and
during said live television program, adjust playback of said buffered content stream based on said action request.

2. The remote time shift buffer system of claim 1 characterized in that:
said client comprises:
a live television input receiving said plurality of television channels;
a channel selector;
a function selector;
a television tuner tunable to a television channel selected from said plurality of television channels selected via said channel selector; and
a controller in communication with said television tuner, said channel selector, and said function selector; and
said remote video recorder comprises:
a live television input receiving the plurality of television channels;
at least one television tuner;
a memory for storing digital video; and
a controller in communication with said at least one television tuner and said memory.

3. The remote time shift buffer system of claim 1 characterized in that said client is further operable to hide the live television content from the viewer after receiving said function input until said buffered content stream is received.

4. The remote time shift buffer system of claim 1 characterized in that said remote video recorder comprises a single network digital video recorder.

5. The remote time shift buffer system of claim 1 characterized in that said remote video recorder comprises a pool of network digital video recorders.

6. The remote time shift buffer system of claim 1 characterized in that said remote video recorder comprises:
a plurality of network digital video recorders having allocable resources including a plurality of television tuners and a plurality of memories;
a front end server in communication with said client and each said network digital video recorder of said plurality of network digital video recorders, said front end server allocating selected resources from said plurality of network digital video recorders on behalf of said client without said client communicating directly with any network digital video recorder from said plurality of network digital video recorders.

7. A method of providing a remote time shift buffer for a client via a remote video recorder, said client having a tuner, said remote video recorder having a tuner and a memory for storing digital video, said client and said remote video recorder in communication over a network, said method comprising the acts of:
tuning the client to a first television channel in response to a channel selection input, the first television channel providing a live television program;
outputting the live television program for viewing by a viewer;
sending a shadowing request from the client to the remote video recorder via the network after the client remains tuned to the first television channel for the live television program for a selected amount of time;
tuning the remote video recorder to the first television channel for the live television program in response to the shadowing request;
buffering the live television content from the first television channel received by the remote video recorder to the memory of the remote video recorder;
after said act of buffering the live television program received by the remote video recorder, receiving a function input corresponding to a pause live television function at the client;
sending an action request from the client to the remote video recorder via the network;
generating a buffered content stream from the television content buffered by the remote video recorder;
receiving the buffered content stream at the client prior to receiving said function input;
adjusting playback of the buffered content stream based on the action request; and
outputting the buffered content stream for viewing by a viewer.

8. The method of claim 7 further comprising the act of verifying the remote video recorder has an unused tuner prior to said act of tuning the remote video recorder to the first television channel.

9. The method of claim 7 further comprising the acts of:
verifying the memory of the remote video recorder has sufficient capacity to buffer a selected amount of live television content prior to buffering the live television content from the first television channel; and
verifying sufficient bandwidth exists for the buffered content stream prior to said act of generating the buffered content stream.

10. The method of claim 7 further comprising the act of pairing the client with the remote video recorder prior to said act of tuning the tuner of the client to a first television channel.

11. The method of claim 7 further comprising the act of terminating said act of buffering the live television content upon receipt of a second shadowing request from the client when said second shadowing request is not associated with a channel selection input and is not preceded by a termination request.

12. The method of claim 7 further comprising the acts of:
receiving the shadowing request at the remote video recorder;
prior to said act of tuning the remote video recorder to the first television channel, sending a conflict message from the remote video recorder to the client when the tuner of the remote video recorder is in current use;
receiving the conflict message at the client;
after receiving the conflict message, offering the viewer an option to override the current use of a tuner of the remote video recorder thereby freeing the tuner of the remote video recorder for use in said act of tuning the remote video recorder to the first television channel.

13. The method of claim 7 further comprising the acts of:
after said act of buffering the live television content, tuning the client to a second television channel in response to a channel selection input;
sending a termination request from the client to the remote video recorder via the network in response to the channel selection input; and
stopping said act of buffering the live television content from the first television channel in response to the termination request.

14. The method of claim 7 further comprising the acts of:
verifying the remote video recorder is capable of fulfilling the shadowing request in response to receiving the shadowing request;
sending an acknowledgement from the remote video recorder to the client in response to the shadowing request after the act of verifying the remote video recorder is capable of fulfilling the shadowing request;
periodically repeating the act of sending a shadowing request from the client to the remote video recorder while the client remains tuned to the first television channel and until the client receives the acknowledgement from the remote video recorder.

15. The method of claim 14 characterized in that the act of sending an acknowledgement from the remote video recorder to the client in response to the shadowing request occurs after the starting act of buffering the live television content from the first television channel received by the remote video recorder to the memory of the remote video recorder.

16. The method of claim 7 further comprising the acts of:
verifying the remote video recorder is capable of fulfilling the shadowing request in response to receiving the shadowing request;
sending an unavailability message from the remote video recorder to the client in response to the shadowing request when the tuner of the remote video recorder is currently in use;
receiving the unavailability message at the client in response;
repeating the act of sending a shadowing request from the client to the remote video recorder after a selected amount of time elapses from receiving the unavailability message and the client remains tuned to the first television channel.

17. The method of claim 7 characterized in that said action request corresponds to a pause function, said method further comprising the acts of:
after said act of generating a buffered content stream, rewinding the buffered content stream to a prior position in the buffered content stream based on a preselected position offset; and
pausing the buffered content stream at the prior position.

18. The method of claim 7 characterized in that said action request corresponds to a pause function, said method further comprising the acts of:
receiving the action request at the remote video recorder;
starting a processing time measurement upon receipt the action request;
after said act of generating a buffered content stream, determining a content stream position offset based on the processing time measurement;
rewinding the buffered content stream to a prior position in the buffered content stream based on the position offset; and
pausing the buffered content stream at the prior position.

19. The method of claim 7 characterized in that said action request corresponds to a record function, said method further comprising the act of preserving the buffered live television content for later playback.

20. A non-transitory computer readable storage medium having computer-executable instructions for providing a remote time shift buffer to a client in communication with a remote video recorder over a network, said instructions comprising:
associating the remote video recorder with the client;
tuning the client to a television channel in response to a channel selection input, the television channel providing a live television program;
starting a camping time measurement in response to the channel selection input;
outputting the live television program from the television channel for the live television program for viewing by a viewer;
measuring a camping time while the client remains tuned to the television channel for the live television program;
requesting the remote video recorder to tune to the television channel for the live television program and to buffer the live television program from the television channel if the camping time exceeds a selected amount of time;
sending an action request to the remote video recorder via the network in response to a function input corresponding to a pause live television function;
after sending the action request, receiving a buffered content stream from the remote video, the buffered content stream derived from the buffered live television program with playback of the buffered content stream adjustable based on the action request; and
outputting the buffered content stream for viewing by the viewer prior to receiving said function input.

* * * * *